May 20, 1958      N. W. SELF      2,835,095
SPRING-LOADED BAIL FOR STRIPPER TYPE COTTON HARVESTERS
Filed June 14, 1955

INVENTOR:
NEAL W. SELF
BY: Emerson B Donnell
ATTORNEY

United States Patent Office 2,835,095
Patented May 20, 1958

2,835,095
SPRING-LOADED BAIL FOR STRIPPER TYPE COTTON HARVESTERS

Neal W. Self, Weaver, Ala., assignor to J. I. Case Company, Racine, Wis., a corporation of Wisconsin Application June 14, 1955, Serial No. 515,375

5 Claims. (Cl. 56—33)

This invention relates to cotton harvesting machines, and, more specifically, it relates to a spring-loaded bail for cotton harvesters of the stripper type.

It is an object of this invention to provide a cotton harvester with stripper rolls whereby the cotton stalks will not be pulled up by the rolls while on the other hand the cotton bolls removed from the stalks will not be lost by falling between the rolls.

Another object of this invention is to provide a cotton harvester with stripper rolls whereby only cotton bolls of at least a minimum size will be removed from the cotton plant.

Still another object is to provide a cotton harvester which will efficiently harvest both light and heavy bearing cotton plants.

Other objects and advantages will become apparent upon reading the following description in conjunction with the accompanying drawings, wherein.

The same reference numerals refer to the same parts throughout the two views.

Figures 1, 2:
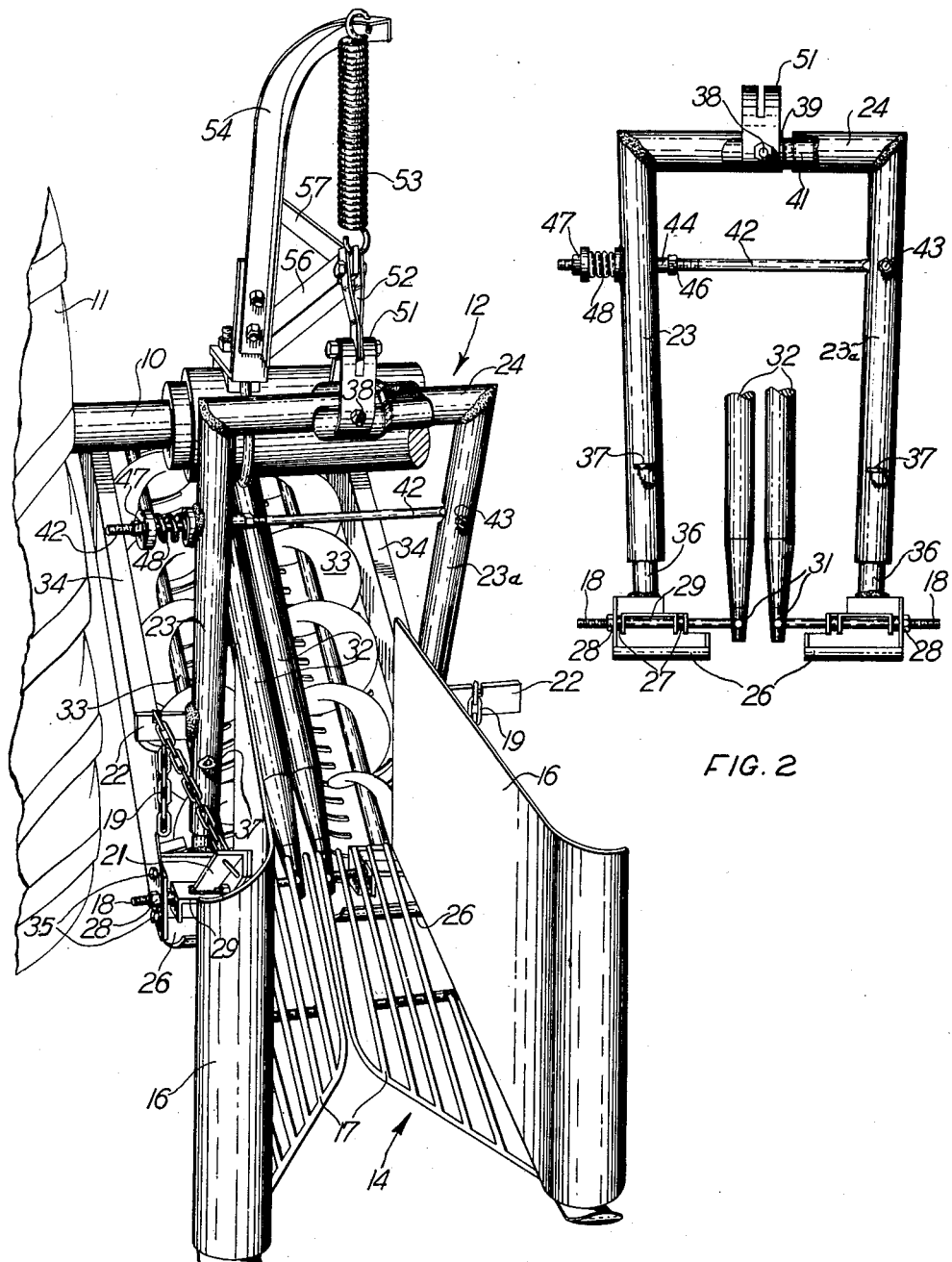
Fig. 1 is a fragmentary front perspective view of a preferred embodiment of this invention with parts broken away and shown in section.
Fig. 2 is a front view of the embodiment shown in Fig. 1 with parts removed and parts broken away.

This invention is adaptable to a conventional type of cotton harvester and, therefore, only a fragment of the harvester is shown and described herein. The remainder of the harvester is of a well-known design.

A fragment of a tractor axle 10 and a wheel 11 are shown in Fig. 1 with a fragment of a cotton stripper unit 12 mounted on the tractor in a well-known manner. The unit 12 consists of a forwardly located gathering point or shoe 14 including the usual side sheets 16 and the lower grates 17. The shoe 14 is suitably pivotally attached as a part of the unit 12 to be pivoted about a horizontal axis such as provided by bolts 18 which are mounted as described later. Thus, the shoe 14 is attached to the front end of the unit 12, by the bolts 18, and through two side chains 19 with each chain connected between an angle 21 on the outside of each sheet 16 and a bracket 22 on the outside of each of the legs 23 and 23a of a U-shaped bail 24, described later.

A pair of brackets or members 26 is disposed behind the sheets 16 with the bolts 18 passing through spaced apart openings in the members 26, and the bolts are maintained in axially fixed positions on the members 26. Spacers 27 are shown in Fig. 2 on the bolts 18 with nuts 28 on the outer ends of the bolts. Also, a channel piece 29 is provided on each bolt 18, as shown, to give rigidity to the assembly. The inner ends of the bolts 18 are suitably attached to bearing studs 31 which telescope with the forward ends of a pair of cotton stripper rolls 32 to rotatably support the latter. Also, in any well-known manner, a pair of augers 33 are disposed parallel to and outside of the stripper rolls 32 to be rotatably supported on the members 26 in any well-known manner for the usual function of conveying the stripped cotton bolls to the rear of the harvester. The usual troughs 34 are also attached at their forward ends to the members 26 as by the nuts 35 on the outside of the members 26.

Of course, in the operation of the harvester, the point 14 is guided down the row of cotton plants which, therefore, are disposed centrally of the point. The stripper unit is thus passed along the plant row as the stripper rolls flank the plants, with a roll on each side of the plants, and the rolls rotate in a direction for advancing upwardly on the plants as the harvester moves forward and the rolls strip the cotton bolls from the plants. That is the normal operation of a cotton stripper.

This operation of course gives rise to very substantial pressure on the individual rolls 32 tending to spread them apart. Agricultural machinery of this general type is inherently flexible or "springy" and the outward pressure may readily spread the rolls and their attached structure including side sheets 16 and grates 17—not to say the rolls themselves—to such an extent that some of the bolls dislodged by the rolls may fall down through the resulting space and be lost. Such spreading of the frame is commonly resisted by a U-shaped bail which extends upwardly to avoid the plants coming into the machine and which is nearly enough rigid to prevent such spreading of the structure. This however can result in such heavy pressure of the rolls on the sides of the cotton stalks, as they are crowded between the rolls, that the rotation of the rolls will pull the plants out of the ground and roll them up into the space intended for the harvested bolls. This of course clogs the machine and is undesirable. The bail provided by the present invention however, while stabilizing the structure, serves to limit the pressure exerted by the rolls on the cotton stalks so that the rolls will slide on the surfaces thereof and not grip them strongly enough to pull them out of the ground.

As previously mentioned, the bail 24 is provided and it is attached to the members 26 through bail legs 23 and 23a. A circular standard 36 is suitably connected, as by welding, for instance, to each of the members 26 to extend thereabove and telescopically engage the lower hollow ends of the bail legs 23 and 23a. The bail and the standards are held telescoped together by pins 37 passing therethrough so that the bail may be readily removed temporarily while the machine is being installed on or removed from the tractor. The important feature of this construction is that the bail 24 is pivoted or hinged together in its opposite halves by a pivot pin or bolt 38 extended through overlapping ends 39 and 41 of the bail cross-piece between the legs 23 and 23a. A tie rod 42 is pivotally attached to the leg 23a by a bolt 43 to extend to the opposite leg 23 and attach thereto through a spacer 44 and a spacing nut 46 on the rod 42 at the inside of the leg with a nut 47 on the rod 42 at the outside of the leg while the rod 42 passes through an opening in the leg 23. A compression coil spring 48 is disposed between the nut 47 and the leg 23, as shown, and which yields so as to limit the outward pressure which may be developed by anything getting between the rolls 32 and tending to spread them apart.

Thus, the bail 24 is pivoted through movement of its legs 23 and 23a about the pivot at bolt 38 and the tie rod 42 sets the limit of inward pivotal movement of the legs 23 by the location of the spacing nut 46 which is threadedly adjustable along the rod 42. The limit of outward pivotal movement of the legs 23 is determined by the setting of the nut 47 which is also threadedly adjustable along the rod 42. Although such limit is not ordinarily reached in the operation of the device, adjustment of nut 47 also serves to adjust the pressure exerted by spring 48 so as to regulate the pressure of rolls 32 against the cotton stalks. The spring 48 is disposed to urge the legs of the bail together or inwardly against any force tending to spread the legs apart. Of course, since the mounting members 26 connect the bail legs 23 and 23a to the rolls 32, the force of the cotton plants between the rolls will be transmitted to the bail 24 and counter the force of the spring 48. Then cotton stalks of a diameter larger than the spacing between the rolls, as determined by the adjustment of the nut 46, will spread the rolls and not be pulled out of the ground into the stripper unit by the rolls as the cotton bolls are stripped from the stalks. Also, the rolls 32 can be spaced apart by the nut 46 according to the average size of cotton plants being harvested so that a minimum of power is required in harvesting and no plants will be pulled into the machine and a heavier crop can be harvested faster than in the time otherwise required.

To complete the description of the construction shown, it is noted that a clevis 51 is pivotally attached to the hinge bolt 38 and extends thereabove to attach to a connector 52. The latter is attached to a coil spring 53 which in turn is connected between a bar 54, secured to the tractor axle 10, and the connector 52 to urge upwardly on the bail 24 and thus the front end of the unit 12 and act as an assisting spring in the upward adjustment of the unit 12. Also, two bars 56 and 57 extend from a suitable mounting on the structure and are shiftable up and down in any well-known manner to provide the actual adjusting connection between the harvester and the front end of the unit 12.

While a specific embodiment of this invention has been shown and described, it should be obvious that certain changes could be made therein and the invention should, therefore, be limited only by the scope of the appended claims.

I claim:

1. In a cotton harvester of the type including a cotton stripper unit, the combination comprising a pair of stripper rolls rotatably mounted at their rear ends on said harvester to be disposed longitudinally of said harvester, a bearing member disposed at the front end of each of said rolls to rotatably support the front ends of said rolls, a bail suspended from said harvester and including a pair of spaced apart and depending legs each separately connected to each said bearing member at the lower ends of said legs, said bail being hinged at the point of suspension from said harvester for lateral movement of said legs with respect to each other, and a spring associated with said bail for yieldingly urging said legs toward each other whereby cotton plants disposed between said rolls can spread the latter apart.

2. In a cotton harvester of the type having cotton stripper units, the combination of a pair of stripper rolls rotatably mounted at the rear ends thereof on said harvester in a parallel position and longitudinally of said harvester, an inverted U-shaped bail including two spaced-apart legs pivotal intermediate the ends of said legs about a pivot axis disposed in a plane parallel to the longitudinal axis of said harvester for movement of said ends of said bail with respect to each other in a direction laterally of said harvester and said bail being suspended from said harvester at said pivot axis to be disposed above the front ends of said rolls, bearings attached between said ends of said bail and the front ends of said rolls for rotatably supporting the latter on said bail, a tie rod attached between said legs of said bail for adjustably maintaining said ends of said bail spaced apart a minimum selected distance and one end of said tie rod extending laterally of one of said legs of said bail, and a spring connected between said one end of said tie rod and said one of said legs of said bail for yieldingly urging said ends of said bail toward each other to said minimum selected distance.

3. In a cotton harvester of the stripper type, a cotton stripper unit comprising a pair of stripper rolls, a mounting member disposed adjacent the forward end of each of said rolls to rotatably support the latter, an inverted U-shaped bail suspended from said harvester with the legs thereof attached to each said member at the downward ends of said legs, a pivot pin connecting said legs of said bail, connector means attached between said pin and said harvester for suspending said unit from said harvester, a tie rod pivotally attached to one of said legs of said bail and extended to the other of said legs of said bail, adjusting means on said rod for attaching to said other of said legs of said bail for providing an adjustable minimum distance between said legs, and a spring attached between said rod and said other of said legs of said bail for yieldingly urging said legs of said bail toward the position of said minimum distance.

4. In a harvester of the type including a bifurcated yieldable structure carrying a pair of juxtaposed rolls designed to operate on plant elements tending to spread the rolls apart with yielding of said structure, means attached to said structure for limiting such spreading and said means including a generally upwardly directed bail having legs connected with said structure on opposite sides of said rolls, said bail having an upper yieldable connecting portion, and resilient means connected to said legs for urging the latter toward each other to provide for controlling the pressure developed upon crop material crowded between said rolls.

5. In a harvester of the type including a bifurcated yieldable structure carrying a pair of juxtaposed rolls designed to operate on plant elements tending to spread the rolls apart with yielding of said structure, means attached to said structure for limiting such spreading and said means including a generally upwardly directed bail having legs connected with said structure on opposite sides of said rolls, said bail having an upper yieldable connecting portion, resilient means connected to said legs for urging the latter toward each other, and an adjustable stop positioned on said legs to limit the inward movement of said legs to predetermine a minimum spacing between said rolls.

References Cited in the file of this patent
UNITED STATES PATENTS

| | | |
|---|---|---|
| 2,388,454 | Weeth et al. | Nov. 6, 1945 |
| 2,406,058 | Boone | Aug. 20, 1946 |
| 2,692,467 | Bigler | Oct. 26, 1954 |